(12) United States Patent
Chen

(10) Patent No.: US 7,603,809 B2
(45) Date of Patent: Oct. 20, 2009

(54) PLANT POT

(76) Inventor: Robert Chen, Room 19, No. 5-3B, Sec. 5, Sinyi Rd., Taipei (TW)

( * ) Notice: Subject to any disclaimer, the term of this patent is extended or adjusted under 35 U.S.C. 154(b) by 71 days.

(21) Appl. No.: 11/859,831

(22) Filed: Sep. 24, 2007

(65) Prior Publication Data

US 2009/0077882 A1  Mar. 26, 2009

(51) Int. Cl.
  *A01G 9/02* (2006.01)
  *A01G 9/04* (2006.01)
  *A47G 7/02* (2006.01)
(52) U.S. Cl. .................. 47/66.2; 47/71; 47/39
(58) Field of Classification Search ............ 47/66.2, 47/66.1, 66.6, 71, 39
See application file for complete search history.

(56) References Cited

U.S. PATENT DOCUMENTS

| | | | | |
|---|---|---|---|---|
| 296,028 A | * | 4/1884 | Martin | 47/71 |
| 1,391,353 A | * | 9/1921 | Wells | 47/71 |
| 2,057,972 A | * | 10/1936 | Pieck | 47/71 |
| 3,987,584 A | * | 10/1976 | Yellin | 47/71 |
| 4,442,629 A | * | 4/1984 | Anderson | 47/71 |
| 5,644,867 A | * | 7/1997 | Gay | 47/71 |
| 5,727,347 A | * | 3/1998 | Sellers | 47/67 |

FOREIGN PATENT DOCUMENTS

JP      2002218848 A  *  8/2002

* cited by examiner

*Primary Examiner*—Son T. Nguyen
(74) *Attorney, Agent, or Firm*—Alan Kamrath; Kamrath & Associates PA

(57) ABSTRACT

A plant pot is used to plant or exhibit flowers and plants and has a pot and a stand. The pot has a stand recess and multiple ribs. The stand recess has an annular sidewall. The ribs are formed separately around the sidewall of the stand recess. The stand is mounted securely below the pot and has a mounting protrusion and multiple sliders. The mounting protrusion corresponds to and is mounted securely in the stand recess and has an annular wall. The sliders are formed separately around the annular wall of the mounting protrusion, correspond to the ribs and are held on the ribs to mount the stand securely on the pot to prevent the stand from detaching from the plant pot to improve safety of use.

3 Claims, 5 Drawing Sheets

PLANT POT

BACKGROUND OF THE INVENTION

1. Field of the Invention

The present invention relates to a plant pot and, more particularly, to a plant pot with a stand mounted below the plant pot.

2. Description of Related Art

With reference to FIG. 6, a conventional plant pot comprises a pot (40) and a stand (50).

The pot (40) has an outer bottom and a stand recess (41). The stand recess (41) is a tapered cylinder and is formed in the outer bottom of the pot (40).

The stand (50) is mounted securely below the pot (40) to elevate the plant pot for exhibiting and has a base (51), a brace (52) and a mounting protrusion (53). The base (51) stands on the ground and may be disk shaped. The brace (52) is formed on and protrudes from the base (51) and has an upper end. The mounting protrusion (53) is formed on and extends from the upper end of the brace (52), and corresponds to and is mounted in the stand recess (41).

However, the pot (40) is merely held on the stand (50) by gravity, with no engaging structure, and, therefore, the pot (40) might fall off during earthquakes or if accidentally hit by passing children. Moreover, the pot (40) may topple if an elderly person rests their weight on the pot (40) when bending over to attend to the pot (40). If the plant pot needs to be moved, the stand (50) dropping out from the pot (40) during moving the plant pot may hurt a mover's foot or damage the stand (50).

To overcome the shortcomings, the present invention provides a plant pot to mitigate or obviate the aforementioned problems.

SUMMARY OF THE INVENTION

The main objective of the invention is to provide a plant pot, which has a stand mounted securely below the plant pot.

The plant pot is used to plant or exhibit flowers and plants and has a pot and a stand. The pot has a stand recess and multiple ribs. The stand recess has an annular sidewall. The ribs are formed separately around the sidewall of the stand recess. The stand is mounted securely below the pot and has a mounting protrusion and multiple sliders. The mounting protrusion corresponds to and is mounted securely in the stand recess and has an annular wall. The sliders are formed separately around the annular wall of the mounting protrusion, correspond to the ribs and are held on the ribs to mount the stand securely on the pot to prevent the stand from detaching from the plant pot to improve safety of use.

Other objectives, advantages and novel features of the invention will become more apparent from the following detailed description when taken in conjunction with the accompanying drawings.

DETAILED DESCRIPTION OF PREFERRED EMBODIMENT

Figure 1:
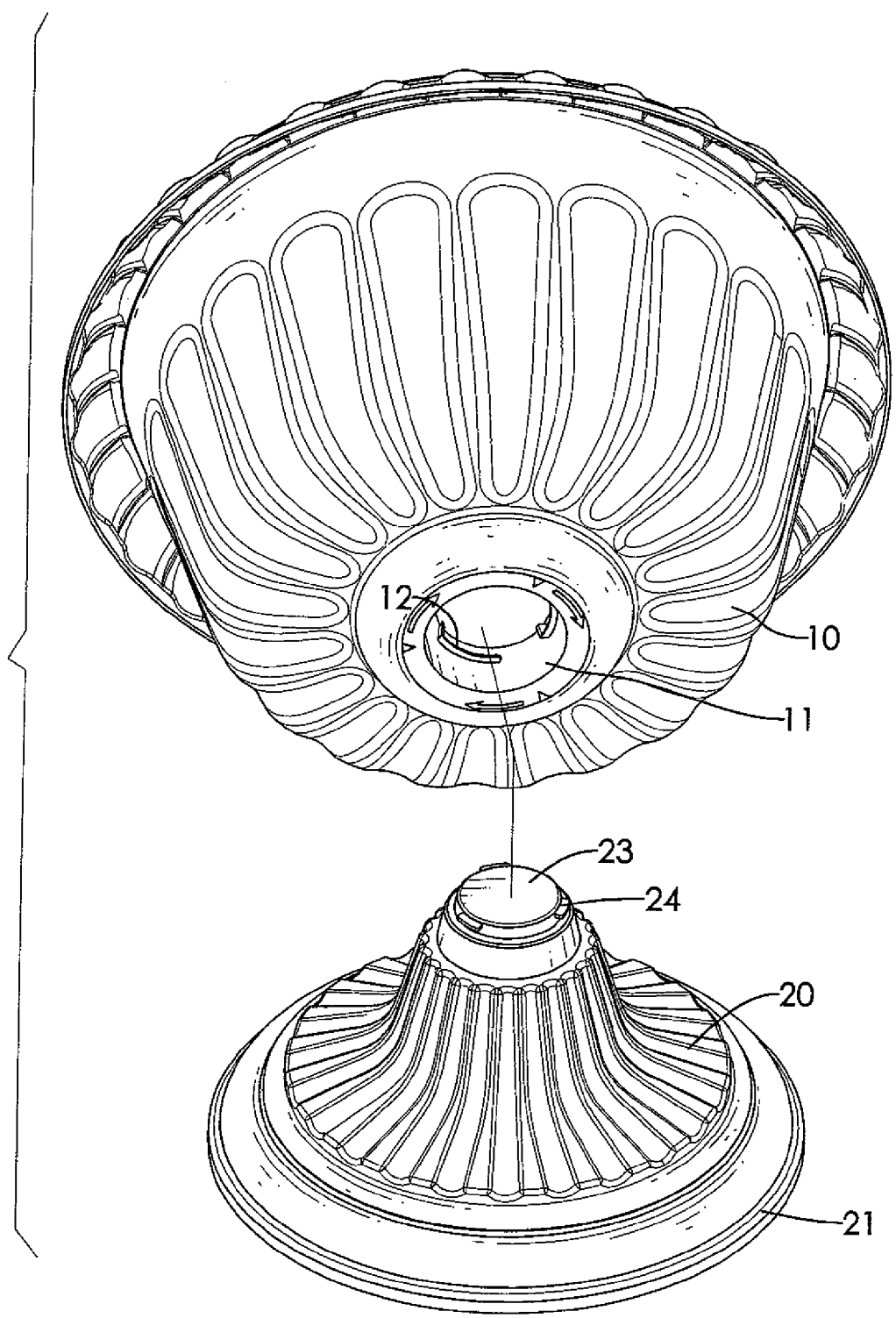
FIG. 1 is a perspective view of a plant pot in accordance with the present invention.
Figure 2:
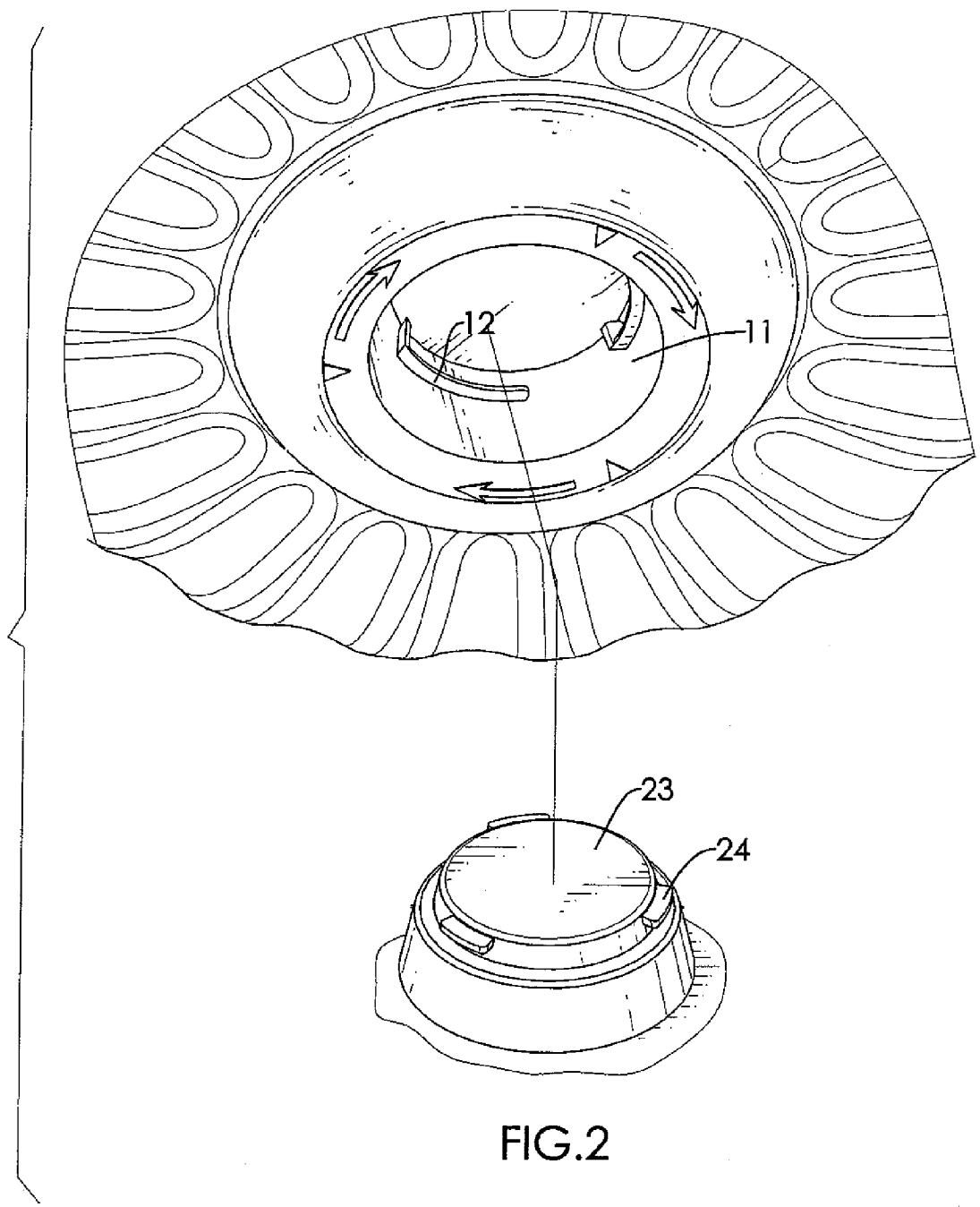
FIG. 2 is an enlarged perspective view of the plant pot in FIG. 1.

With reference to FIGS. 1 and 2, a plant pot in accordance with the present invention is used to plant or exhibit flowers and plants and comprises a pot (10) and a stand (20).

The pot (10) is used to hold the soil, the flowers and plants and has an outer bottom, a stand recess (1) and multiple ribs (12).

Figure 3:
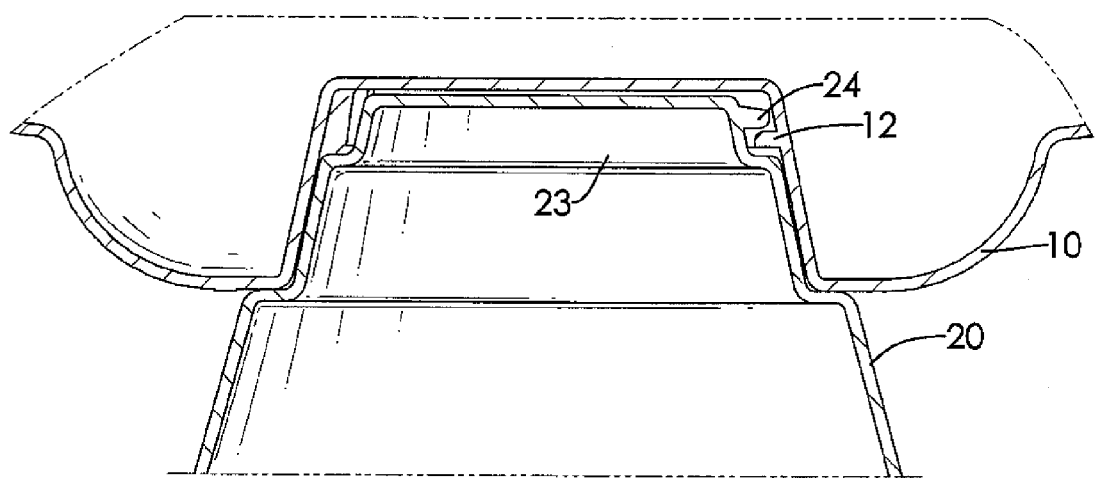
FIG. 3 is an enlarged cross-sectional front view of the plant pot in FIG. 1.

With further reference to FIG. 3, the stand recess (11) is substantially cylindrical, is formed in the outer bottom of the pot (10), may be tapered and has an annular sidewall.

The ribs (12) are formed separately on and protrude transversely around the sidewall of the stand recess (11). Each rib (12) may be L-shaped to form an entry and a stop and is arranged in the same direction.

The stand (20) is a vertical brace, is mounted securely below the pot (10) to elevate and support the pot (10), and has a lower end, an upper end, an optional base (21), a mounting protrusion (23) and multiple sliders (24).

The base (21) is formed around the lower end of the stand (20) to stand on a surface such as a patio, garden or ground and is disk-shaped.

The mounting protrusion (23) is formed on and protrudes from the upper end of the stand (20), corresponds to and is mounted securely in the stand recess (11) and has an annular wall.

Figure 4:
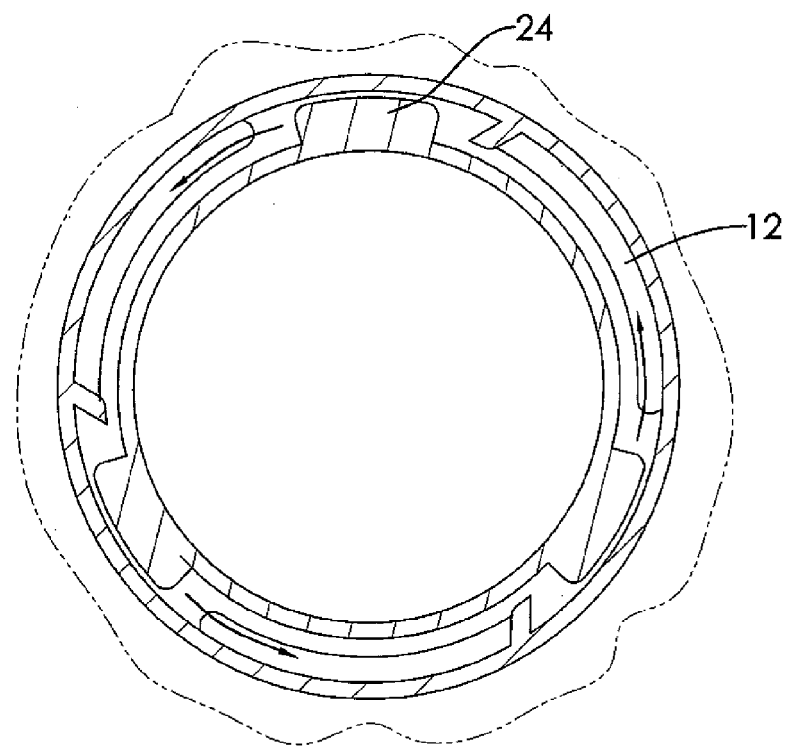
FIG. 4 is an operational cross-sectional top view of the plant pot in FIG. 1, shown disengaged.
Figure 5:
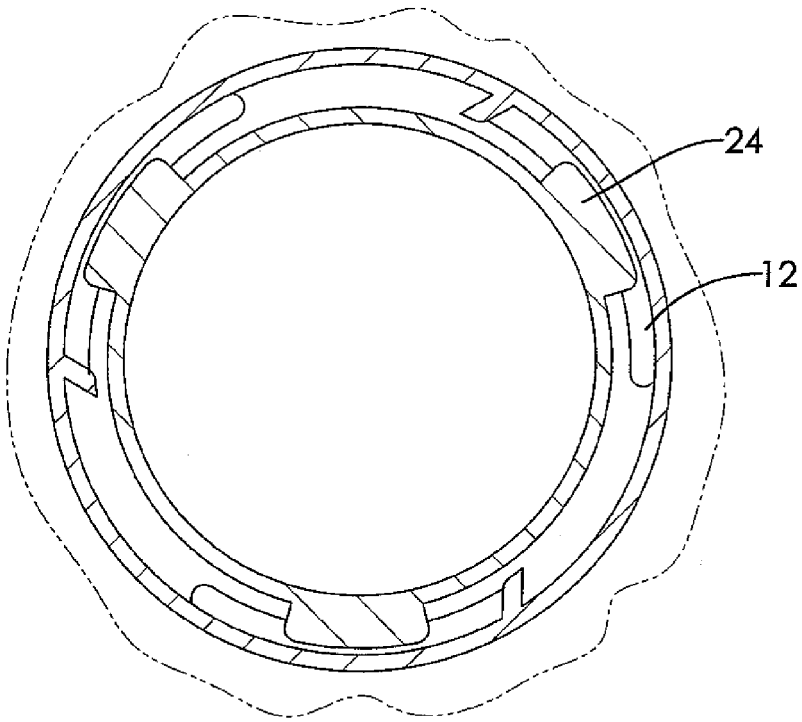
FIG. 5 is an operational cross-sectional top view of the plant pot in FIG. 1, shown engaged.
Figure 6:
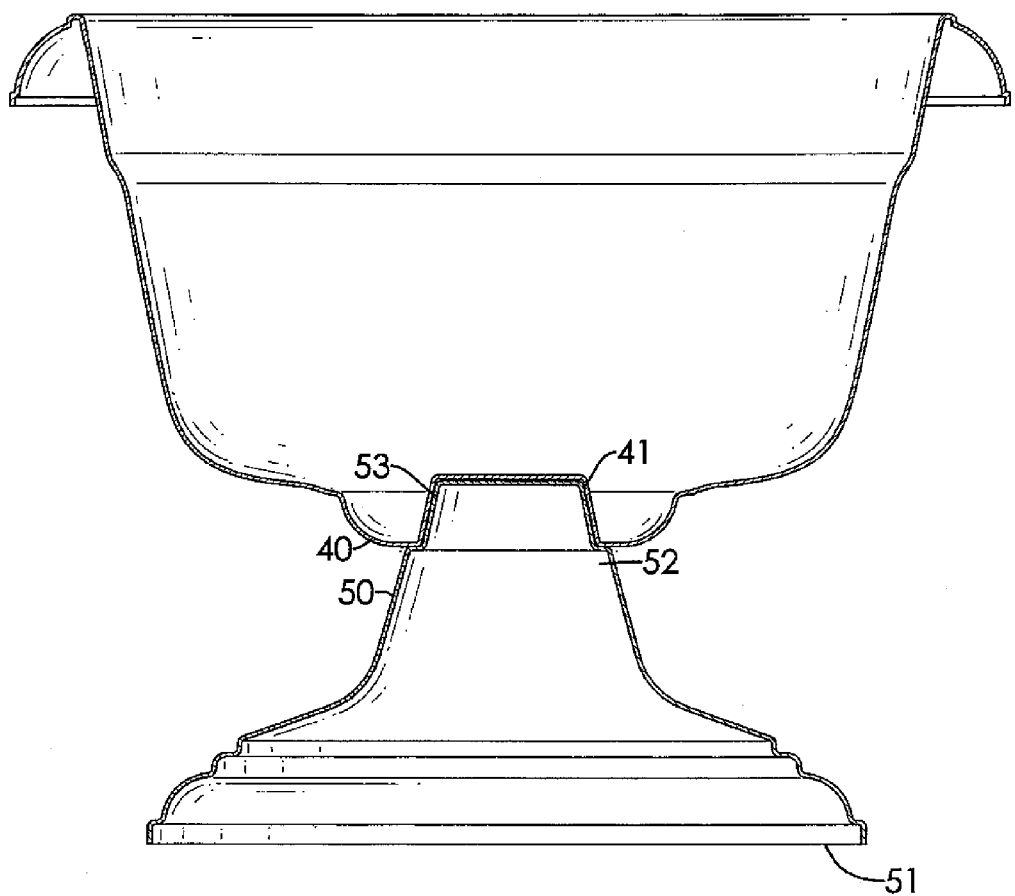
FIG. 6 is a cross-sectional front view of a conventional plant pot in accordance with the prior art.

With further reference to FIGS. 4 and 5, the sliders (24) are formed separately on and protrude transversely around the annular wall of the mounting protrusion (23), correspond to the ribs (12) and slide into the entry of the ribs (12) to be held on the ribs (12) to mount the stand (20) securely below the pot (10).

Consequently, the ribs (12) and the sliders (24) engaging with each other improves connection between the pot (10) and the stand (20) for preventing accidental disconnection and improving safety of use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A plant pot comprising:
   a pot having
      an outer bottom;
      a stand recess being cylindrical, being formed in the outer bottom of the pot and having an annular sidewall; and
      multiple ribs being formed separately on and protruding transversely around the sidewall of the stand recess, wherein each rib is L-shaped and includes first and second legs extending transversely from the sidewall, with the first leg extending generally parallel to the outer bottom of the pot and the second leg extending from the first leg away from the outer bottom of the pot, with the first leg forming an entry and the second leg forming a stop, with the multiple ribs being arranged in a same direction; and a stand being a vertical brace, being mounted securely below the pot and having
  a lower end;
  an upper end;
  a mounting protrusion being formed on and protruding from the upper end of the stand, corresponding to and being mounted securely in the stand recess and having an annular wall; and
  multiple sliders being formed separately on and protruding transversely around the annular wall of the mounting protrusion, corresponding to and slid respectively into the entries of the multiple ribs to be held on the multiple ribs.

2. The plant pot as claimed in claim 1, wherein the annular sidewall of the stand recess is tapered away from the outer bottom of the pot.

3. The plant pot as claimed in claim 2, wherein the stand further has a base formed around the lower end of the stand and being disk-shaped.

* * * * *